G. H. BOLUS.
TROLLEY WHEEL MOUNT.
APPLICATION FILED FEB. 9, 1912.
1,138,723. Patented May 11, 1915.
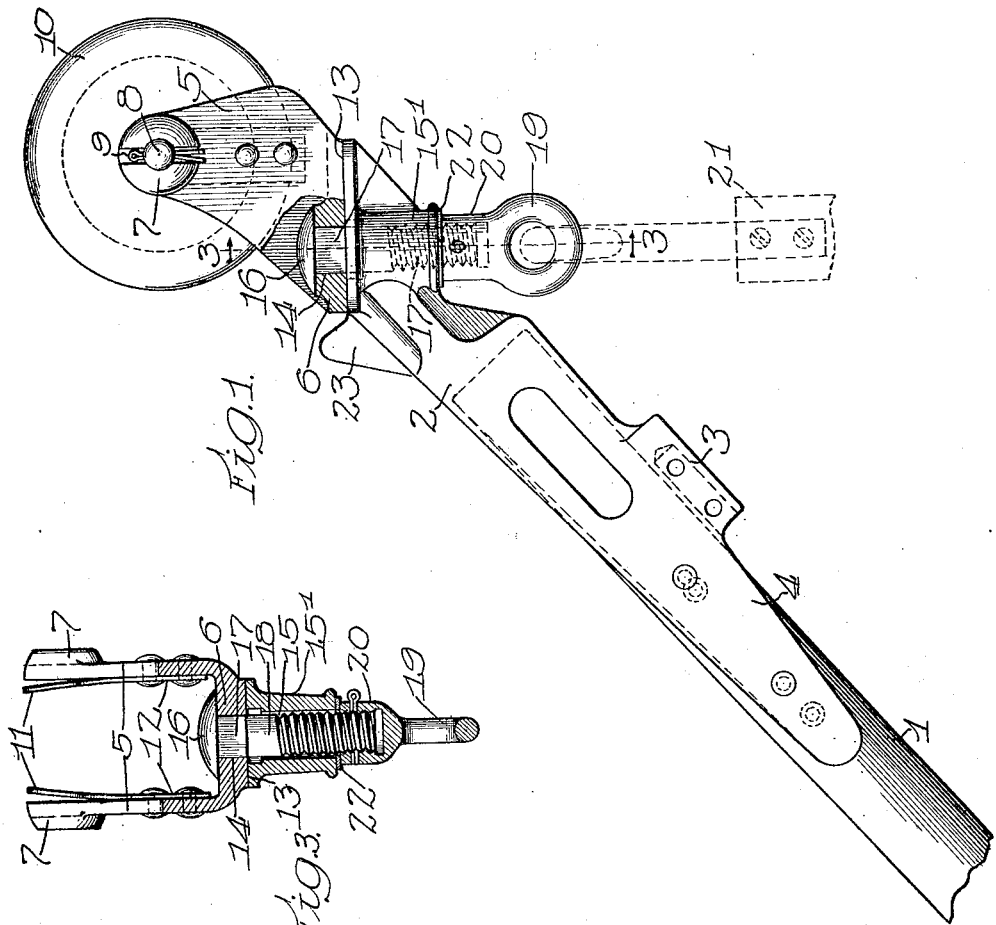
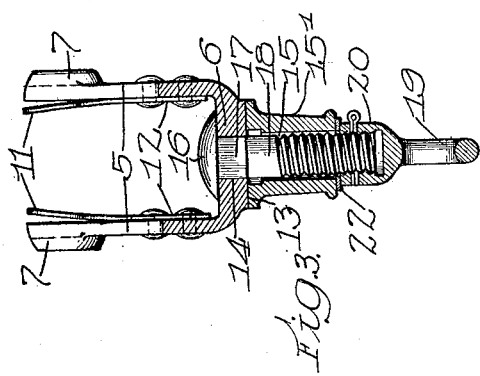
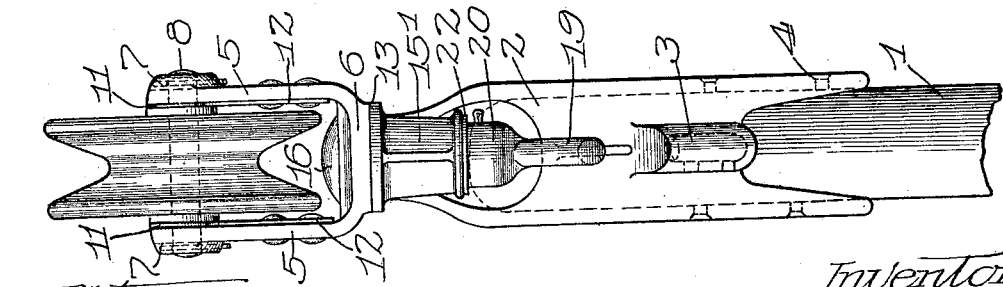
Witnesses:
Inventor:
Glenn H. Bolus
By Brown & Hopkins
Attys:

UNITED STATES PATENT OFFICE.

GLENN HENRY BOLUS, OF MANSFIELD, OHIO, ASSIGNOR TO THE OHIO BRASS COMPANY, OF MANSFIELD, OHIO, A CORPORATION OF NEW JERSEY.

TROLLEY-WHEEL MOUNT.

1,138,723.

Specification of Letters Patent.

Patented May 11, 1915.

Application filed February 9, 1912. Serial No. 676,518.

*To all whom it may concern:*

Be it known that I, GLENN H. BOLUS, a citizen of the United States, residing at Mansfield, in the county of Richland and State of Ohio, have invented certain new and useful Improvements in Trolley-Wheel Mounts, of which the following is a specification.

My invention relates to trolleys for electric railways, and has more particular reference to trolleys used on electric mining locomotives.

One of the objects of my invention is to provide an improved trolley which will be simple and durable in construction, and effective and efficient in operation.

Another object of my invention is to provide an improved device embodying trolley pole or supporting member, a relatively movable trolley harp, and means whereby the trolley harp may be quickly and safely placed in or restored to its operating position by the operator without any necessity whatsoever of his handling the trolley pole or other live parts of the apparatus.

With these and other objects in view, my invention consists in the features of novelty disclosed in the construction, combination and arrangement of parts herein described and claimed, and shown in the accompanying drawing, which illustrates one form of my invention, and in which—

Figure 1 is a view in elevation of the upper portion of a trolley which embodies my invention. Fig. 2 is a view in elevation at right angles thereto, and Fig. 3 is a sectional view on the line 3—3 of Fig. 1.

In some classes of electric railways, particularly railways which are used in mines, the restricted space makes it necessary to use comparatively short rigid trolley poles. These trolley poles are generally yieldingly mounted upon the side of the locomotive, and are composed, for the main part, of wood or other insulating material having metallic members at the lower and upper ends, the lower member being secured to the side of the locomotive, and the upper member having or supporting the trolley harps. These metallic parts generally carry current, being connected together by suitably insulated conductors so as to convey the current from the trolley wheel which contacts with the trolley wire, to the motors. One of the purposes in using wood trolley poles is to enable the operator to grasp hold of the pole in order to replace the trolley wheel, in contact with the trolley wire whenever it has accidentally jumped off the trolley wire or become disconnected therefrom. In spite of precautions, however, the operator often comes in contact in some manner with the various live parts of the apparatus, and receives serious and sometimes fatal shocks. By virtue of my invention I eliminate these objections. I provide an improved trolley embodying means by which the trolley wheel may be restored to its proper operating position in contact with the wire without the necessity of the operator touching or handling any of the live parts of the apparatus.

In the structure shown in the drawings it will be seen that the trolley pole 1, which is generally made of wood, or other insulating material, has at its upper end a metallic cap or member 2, upon which the operating parts are mounted. This cap or supporting member 2 may be connected to the lower metallic end (not shown) of the trolley pole by means of suitably insulated conductors, a terminal socket 3 being provided on the cap to which these conductors may be connected. The cap 2 is firmly secured to the end of the wooden pole by means of long ears or projections 4 which form a socket into which the end of the pole is inserted and fastened. The trolley wheel or other contact member which engages the trolley wire is mounted to rotate in a suitable harp. In the present construction this harp is formed by two parallel arms or side members 5 rising from a bottom or base plate 6. The upper ends of the side members are formed as journal bearings 7 for the trolley wheel shaft 8, as clearly shown. The shaft may be secured in position by means of cotter pins 9 extending through holes in the ends thereof. The trolley harp conveys the current from the trolley wheel 10, and a good electric contact may be made between the wheel and the arms of the trolley harp by means of a pair of suitably formed flat springs 11. The lower ends 12 of the springs may be riveted or otherwise secured to the arms 5 of the harp, and the upper ends yieldingly press against the hub ends of the trolley wheel.

In the structure shown the trolley harp is swiveled or otherwise mounted upon the cap member or support 2, so as to be relatively movable and thereby enable the trolley wheel to follow the many turns and bends in the trolley wires which are necessarily incident to the stringing of trolley wires in a mine shaft. It will be seen that the upper end of the cap member 2 is formed with a broad, preferably perfectly flat surface 13, which in the normal operating angular position of the trolley pole, lies in a substantially horizontal plane. The upper end of this member 2 thus forms a platform upon which the trolley harp may rotate, and the under surface of the bottom member 6 of the harp is likewise smooth and flat, thus providing a large area of contact surface. The bottom member 6 of the harp has an opening 14 which registers with a bore or elongated opening 15 formed by an enlargement 15¹ beneath the platform surface 13. A pivot bolt extends through these openings and projects some distance below the end of the opening 15 and constitutes a pivot upon which the trolley harp rotates. This bolt is preferably of the carriage-bolt type having a large round head 16, a squared portion 17 immediately adjacent its head, and a threaded shank 18. The opening 14 in the bottom 6 of the trolley harp is preferably squared to receive the squared portion 17 of the pivot bolt, so that the trolley harp may be turned or rotated when the bolt is turned. It will be observed that when the trolley pole as a whole is in its normally inclined operating position (substantially that shown in Fig. 1), the pivotal axis of the trolley harp is disposed in a substantially vertical line in advance of the shaft of the trolley wheel, the greater part of the weight of the trolley harp being disposed in the rear of this pivotal axis. This arrangement makes the trolley self-adjusting to the tortuously suspended trolley wire, and the trolley wheel trails properly along the wire, as the locomotive moves. It often happens, that due to various causes, the trolley wheel leaves the wire, and the trolley pole swings upward and forward with considerable force. Hence when it strikes a cross wire or other obstruction in the mine the momentum generally throws or rotates the trolley harp forward out of its normal operating position. My improved mechanism eliminates any necessity for the operator to catch hold of the trolley pole and swing the trolley harp into its normal trailing position preparatory to placing the wheel in contact with the trolley wire. The projecting end of the pivot bolt carries a loop or eye member 19 having an internally threaded socket portion 20, into which the bolt is threaded, as shown clearly in Fig. 3. The operator may attach an insulated handle 21, such, for instance, as shown in dotted lines in Fig. 2, to the eye member 19. This insulated handle may hang freely from the eye member 19, and in the event that the trolley wheel jumps off of the wire, it is simply necessary for the operator to grasp the handle 21 and rotate it sufficiently to return the trolley harp and wheel to their trailing position, this being done usually at the same time that he pulls down the trolley pole. The eye member 19 also serves as a nut on the end of the bolt 16 to hold the parts together in rotatable relation. A hole may be drilled through the socket portion 20 and the bolt into which a cotter pin or other device may be inserted to lock the eye member and the bolt against relative rotation. This construction enables these parts to be readily disassembled for the purpose of repair. I interpose a spring washer 22, which resiliently holds the parts together, and at the same time insures a good connection at the joint.

In the structure shown in the drawing I find it desirable to cast a small lug or projection 23 upon the upper end portion of the cap member 2, the purpose of this being to serve as a deflector or guard and prevent the platform portion of the cap member 2 or the corners of the harp from catching in the cross wires when the trolley jumps off the wire.

It is obvious, after having obtained an understanding of my invention from the disclosures herein made, that the invention may be embodied in various structures designed for particular conditions, and accordingly I do not wish to be understood as being limited to the particular structure and arrangement of parts herein shown and described.

What I claim is:

1. In apparatus of the class described, the combination of a trolley pole having a flat surfaced bearing at its upper end, a correspondingly surfaced member rotatably mounted thereon and having trolley wire contacting means, a detachable pivot bolt connected to said member and projecting through said bearing for rotating said member, and an eye-member threaded on said bolt below said bearing.

2. In a trolley of the class described, the combination of a trolley pole, a trolley harp pivotally mounted at the end thereof, and disposed generally at one side of its pivotal axis to cause said harp to automatically follow the trolley wire when in operating relation thereto, a pivot bolt connected to said harp, and depending below said harp, a removable eye-member on the end of said pivot bolt and a depending handle attached to said eye member for rotating said harp into operating relation to the trolley wire.

3. The combination of a substantially vertically disposed bearing member having a broad, flat bearing surface at its upper end disposed in a plane substantially at right angles to said bearing, a substantially U- shaped trolley harp disposed generally at one side of the longitudinal axis of the bearing and having a broad, flat bottom surface resting upon said bearing surface, said harp having a squared opening positioned in line with said bearing, a pivot bolt extending down through said squared opening and bearing and having its upper portion removably fitted in said squared opening, and means attached to the end of the bolt below the bearing for rotating the bolt and harp.

4. The combination of a substantially vertically disposed bearing member having a broad, flat bearing surface at its upper end disposed in a plane substantially at right angles to said bearing, a substantially U-shaped trolley harp disposed generally at one side of the longitudinal axis of the bearing and having a broad, flat bottom surface resting upon said bearing surface, said harp having a squared opening positioned in line with said bearing, a pivot bolt extending down through said squared opening and bearing and having its upper portion removably fitted in said squared opening, an eye-member threaded onto the end of said bolt below said bearing, and an operating handle attached to said eye-member.

In testimony whereof I have signed my name to this specification, in the presence of two subscribing witnesses, on this 6th day of February A. D. 1912.

GLENN HENRY BOLUS.

Witnesses:
   J. ROWLAND BROWN,
   J. C. PAINTER.

Copies of this patent may be obtained for five cents each, by addressing the "Commissioner of Patents, Washington, D. C."